United States Patent [19]
Manning et al.

[11] Patent Number: 5,862,137
[45] Date of Patent: Jan. 19, 1999

[54] POINT-TO-MULTIPOINT ARBITRATION

[75] Inventors: Thomas A. Manning, Northboro; Stephen A. Caldara, Sudbury; Stephen A. Hauser, Burlington, all of Mass.; Matthias L. Colsman, Cologne, Germany

[73] Assignees: Fujitsu Network Communications, Inc., Richardson, Tex.; Fujitsu Limited, Kawasaki, Japan

[21] Appl. No.: 683,333

[22] Filed: Jul. 18, 1996

Related U.S. Application Data

[60] Provisional application No. 60/001,498, Jul. 19, 1995.

[51] Int. Cl.$^6$ ..................................................... H04L 12/56
[52] U.S. Cl. ........................................... 370/395; 370/468
[58] Field of Search ..................................... 370/395, 389, 370/449, 444, 451, 455, 252, 397, 412, 418, 468, 477, 428, 429; 340/825.5, 825.51

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,159 | 10/1989 | Hemmady et al. | 370/60 |
| 4,872,160 | 10/1989 | Hemmady et al. | 370/60 |
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |

(List continued on next page.)

OTHER PUBLICATIONS

As Ascom Timeplex White Paper, *Meeting Critical Requirements with Scalable Enterprise Networking Solutions Based on a Unified ATM Foundation*, pp. 1–12, Apr. 1994.

Douglas H. Hunt, *ATM Traffic Management—Another Perspective*, Business Communications Review, Jul. 1994.

Richard Bubenik et al., *Leaf Initiated Join Extensions*, Technical Committee, Signalling Subworking Group, ATM Forum/94–0325R1, Jul. 1, 1994.

Douglas H. Hunt et al., *Flow Controlled Virtual Connections Proposal for ATM Traffic Management (Revision R2)*, Traffic Management Subworking Group, ATM_Forum/94–0632R2, Aug. 1994.

(List continued on next page.)

*Primary Examiner*—Dang Ton
*Attorney, Agent, or Firm*—Weingarten, Schurgin, Gagnebin & Hayes LLP

[57] ABSTRACT

An Asynchronous Transfer Mode switch and method which facilitate point-to-multipoint transmission are disclosed. The switch includes a bandwidth arbiter, and each input port within the switch includes a switch allocation table ("SAT") which controls bandwidth allocation between input and output ports. Each SAT includes a plurality of sequentially ordered cell time slots and a synchronized pointer which is directed to one of the slots such that at any given point in time each of the pointers is directed to the same slot location in the respective SAT with which the pointer is associated. To execute point-to-multipoint operation the bandwidth arbiter maintains a list of connections and bit vectors indicating the designated destination ports for a point-to-multipoint cell. The list maintained by the bandwidth arbiter is then compared to an unassigned output port bit vector generated from the SATs to determine matches therebetween, at which point-to-multipoint transmission may be made by utilizing instantaneously unused bandwidth within the switch while arbitration distributes bandwidth among competing point-to-multipoint connections. The bandwidth arbiter may also assign priority to connections in the list.

25 Claims, 5 Drawing Sheets

U.S. PATENT DOCUMENTS

| | | | |
|---|---|---|---|
| 4,894,824 | 1/1990 | Hemmady et al. | 370/58.3 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,935 | 6/1990 | Adams | 370/406 |
| 4,933,938 | 6/1990 | Sheehy | 370/85.13 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 385/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Faulk, Jr. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/232 |
| 5,315,591 | 5/1994 | Brent et al. | 370/389 |
| 5,319,638 | 6/1994 | Lin | 370/60 |
| 5,321,695 | 6/1994 | Proctor et al. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono et al. | 379/92 |
| 5,365,514 | 11/1994 | Hershey et al. | 370/17 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,394,397 | 2/1995 | Yanagi et al. | 370/60.1 |
| 5,398,235 | 3/1995 | Tsuzuki et al. | 370/16 |
| 5,400,337 | 3/1995 | Munter | 370/60.1 |
| 5,402,415 | 3/1995 | Turner | 370/60 |
| 5,412,648 | 5/1995 | Fan | 370/60 |
| 5,414,703 | 5/1995 | Sakaue et al. | 370/60 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/60.1 |

| Patent No. | Date | Inventor | Class |
|---|---|---|---|
| 5,440,547 | 8/1995 | Easki et al. | 370/60 |
| 5,444,702 | 8/1995 | Burnett et al. | 370/60.1 |
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,450,406 | 9/1995 | Esaki et al. | 370/60.1 |
| 5,452,296 | 9/1995 | Shizimu | 370/60.1 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/67.1 |
| 5,461,611 | 10/1995 | Drake, Jr. et al. | 370/54 |
| 5,463,620 | 10/1995 | Sriram | 370/60 |
| 5,465,331 | 11/1995 | Yang et al. | 395/200.08 |
| 5,475,679 | 12/1995 | Munter | 370/58.2 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,517,495 | 5/1996 | Lund et al. | 370/60 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Dighe et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,550,823 | 8/1996 | Irie et al. | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/60.1 |
| 5,577,032 | 11/1996 | Sone et al. | 370/58.3 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/232 |

OTHER PUBLICATIONS

Flavio Bonomi et al., *The Rate–Based Flow Control Framework for the Available Bit Rate ATM Service,* IEEE Network, Mar./Apr. 1995, pp. 25–39.

R. Jain, *Myths About Congestion Management in High Speed Networks,* Internetworking Research and Experience, vol. 3, 101–113 (1992).

Douglas H. Hunt et al., *Credit–Based FCVC Proposal for ATM Traffic Management (Revision R1),* ATM Forum Technical Committee Traffic Management Subworking Group, ATM_Forum/94–0168R1, Apr. 28, 1994.

Douglas H. Hunt et al., *Action Item Status for Credit–Based FCVC Proposal,* ATM Forum Technical Committee Traffic Management Subworking Group, ATM_Forum/94–0439, Apr. 28, 1994.

Timothy P. Donahue et al., *Arguments in Favor of Continuing Phase 1 as the Initial ATM Forum P–NNI Routing Protocol Implementation,* ATM Forum Technical Committee, ATM Forum/94–0460, Apr. 28, 1994.

Richard Bubenick et al., *Leaf Initiated Join Extensions,* Technical Committee, Signalling Subworking Group, ATM Forum/94–0325, Apr. 28, 1994.

Rob Coltun et al., *PRP: A P–NNI Routing Protocol Proposal,* ATM Forum Technical Committee, ATM_Forum/94–0492, Apr. 28, 1994.

Richard Bubenik et al., *Leaf Initiated Join Extensions,* ATM Forum Technical Committee, Signalling Subworking Group, ATM Forum 94–0325, Apr. 28, 1994.

Richard Bubenik et al., *Requirements For Phase 2 Signalling Protocol,* ATM Forum Technical Committee, Signalling Subworking Group, ATM Forum 94–1078, Jan. 1, 1994.

SITA, ATM RFP: C–Overall Technical Requirements, Sep. 1994.

Head of Line Arbitration in ATM Switches with Input–Output Buffering and Backpressure Control. by Hosein F. Badran and H. T. Mouftah, *Globecom '91,* pp. 0347–0351.

H.T. Kung and K. Chang, *Receiver–Oriented Adaptive Buffer Allocation in Credit–Based Flow Control for ATM Networks,* Proceedings of InfoCom '95, Apr. 2–6, 1995, pp. 1–14.

H.T. Kung, et al., *Credit–Based Flow Control for ATM Networks: Credit Update Protocol, Adaptive Credit Allocation, and Statistical Multiplexing,* Proceedings of ACM SigComm '94 Symposium on Communications Architectures, Protocols and Applications, Aug. 31–Sep. 2, 1994, pp. 1–14.

TSPP i+1

| y | h | p | q |
|---|---|---|---|
| 0 | 0 | 0 | 1 |
| 0 | 0 | 0 | 0 |
| 1 | 1 | 0 | 0 |
| 0 | 0 | 0 | 0 |
| 1 | 0 | 1 | 1 |
| 0 | 0 | 1 | 0 |
| 0 | 1 | 0 | 0 |
| 0 | 1 | 0 | 0 |

TSPP i — 56

| m | r | k | a |
|---|---|---|---|
| 0 | 1 | 1 | 0 |
| 0 | 0 | 1 | 0 |
| 0 | 0 | 1 | 0 |
| 0 | 1 | 1 | 0 |
| 0 | 1 | 1 | 0 |
| 1 | 0 | 0 | 1 |
| 0 | 0 | 0 | 1 |
| 1 | 0 | 0 | 0 |

} 58

NEWEST     OLDEST

LISTS MAINTAINED BY BANDWIDTH ARBITER 53

POINT-TO-MULTIPOINT ARBITRATION

FIELD OF THE INVENTION

The present invention is generally related to telecommunications networks, and more particularly to point-to-multipoint arbitration, bandwidth allocation and delay management within an asynchronous transfer mode switch.

RELATED APPLICATION

A claim of priority is made to provisional application 60/001,498 entitled COMMUNICATION METHOD AND APPARATUS, filed Jul. 19, 1995.

BACKGROUND OF THE INVENTION

Telecommunications networks such as asynchronous transfer mode ("ATM") networks are used for transfer of audio, video and other data. ATM networks deliver data by routing data units such as ATM cells from source to destination through switches. Switches include input/output ("I/O") ports through which ATM cells are received and transmitted. The appropriate output port for transmission of the cell is determined based on the cell header.

One problem associated with ATM networks is loss of cells. Cells are buffered within each switch before being routed and transmitted from the switch. More particularly, switches typically have buffers at either the inputs or outputs of the switch for temporarily storing cells prior to transmission. As network traffic increases, there is an increasing possibility that buffer space may be inadequate and data lost. If the buffer size is insufficient, cells are lost. Cell loss causes undesirable interruptions in audio and video data transmissions, and may cause more serious damage to other types of data transmissions.

In point-to-multipoint transmission a cell is transmitted from a single input to multiple outputs across the switch fabric. In order to execute such a transmission, each of the designated outputs must be available to receive the cell from the transmitting input, i.e., have adequate buffer space. However, the likelihood that each of the designated outputs will be simultaneously prepared to receive the cell when the cell is enqueued decreases as traffic within the switch increases. In some circumstances this may result in delayed transmission. In the worst case, cells will be delayed indefinitely and incoming cells for that connection are discarded. It would therefore be desirable to facilitate point-to-multipoint transmission by reducing or eliminating delays and cell loss.

SUMMARY OF THE INVENTION

An Asynchronous Transfer Mode ("ATM") switch and method which facilitate point-to-multipoint transmission is disclosed. The ATM switch includes a bandwidth arbiter, a plurality of input ports and a plurality of output ports. Each input port within the switch includes a switch allocation table ("SAT") which grants bandwidth to connections. Each SAT includes a plurality of sequentially ordered cell time slots and a pointer which is directed to one of the slots. The SAT pointers at each input port are synchronized such that, at any given point in time, each of the pointers is directed to the same slot location in the respective SAT with which the pointer is associated.

Each connection is assigned bandwidth types based on the traffic type associated with the connection. There are two types of bandwidth to grant within the switch: allocated and dynamic. Allocated bandwidth is bandwidth which is "reserved" for use by the connection to which the bandwidth is allocated. Generally, a connection with allocated bandwidth is guaranteed access to the full amount of bandwidth allocated to that connection. As such, traffic types that need deterministic control of delay are assigned allocated bandwidth. Dynamic bandwidth is bandwidth which is "shared" by any of various competing connections. Because dynamic bandwidth is a shared resource, there is generally no guarantee that any particular connection will have access to a particular amount of bandwidth. For this reason dynamic bandwidth is typically assigned to connections with larger delay bounds. Other connections may be assigned a combination of dynamic and allocated bandwidth. Any cell time where the SAT entry is not valid or where the scheduling list does not contain a cell thus represents an unassigned bandwidth opportunity.

To execute point-to-multipoint operation the bandwidth arbiter maintains a list of connections and bit vectors indicating the designated destination ports for a point-to-multipoint cell. The list maintained by the bandwidth arbiter is then compared to an unassigned output port bit vector generated from the SATs to determine matches there between at which point-to-multipoint transmission may be made by utilizing the instantaneously unused bandwidth within the switch. The bandwidth arbiter may also assign priority to connections in the list.

Switch efficiency is increased by utilizing instantaneously unused bandwidth. When switch traffic increases, available bandwidth decreases and collisions become more frequent. Nevertheless, unutilized bandwidth will be present from time to time, and such bandwidth is wasted if not utilized. Therefore, point-to-multipoint transmissions which would otherwise be dropped are made using the otherwise unutilized bandwidth, and switch efficiency is increased.

BRIEF DESCRIPTION OF THE DRAWING

These and other features and advantages of the present invention will become apparent from the following detailed description of the drawing in which.

DETAILED DESCRIPTION OF THE DRAWING

Figure 1:
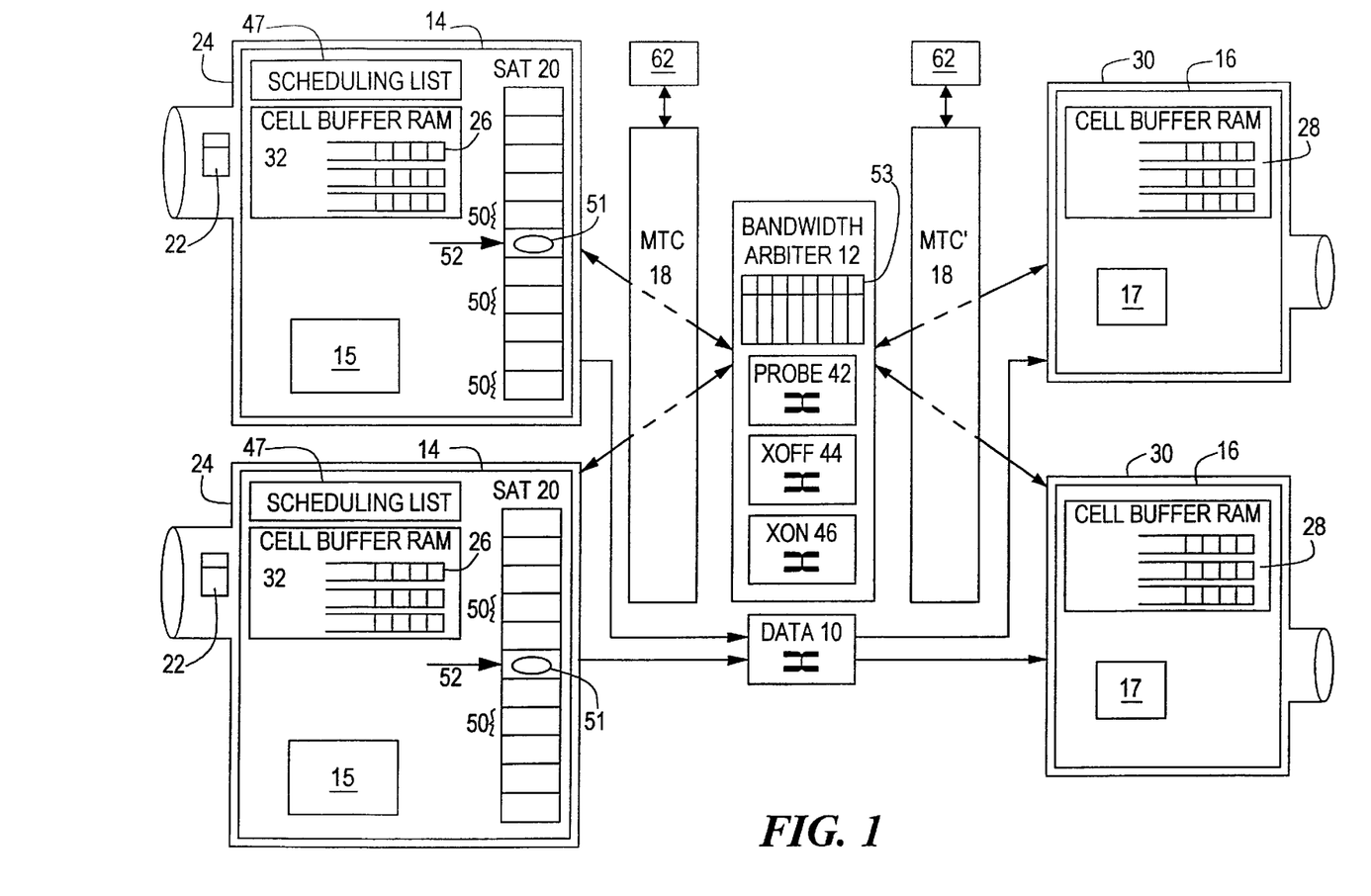
FIG. 1 is a block diagram of a switch which facilitates point-to-multipoint operation.

Referring now to FIG. 1, the switch includes an N×N switch fabric 10, a bandwidth arbiter 12, a plurality of to switch port processor subsystems ("TSPP") 14, a plurality of To Switch Port Processor ASICs 15, a plurality of from switch port processor subsystems ("FSPP") 16, a plurality of To Switch Port Processor ASICs 17, a plurality of multipoint topology controllers ("MTC") 18 and a plurality of switch allocation tables ("SAT") 20. The N×N switch fabric, which may be an ECL crosspoint switch fabric, is used for cell data transport, and yields N×670 Mbps throughput. The bandwidth arbiter controls switch fabric interconnection dynamically schedules momentarily unused bandwidth and resolves multipoint-to-point bandwidth contention. Each TSPP 14 schedules transmission of cells 22 to the switch fabric from multiple connections. Not shown are the physical line interfaces between the input link and the TSPP 14. The FSPP 16 receives cells from the switch fabric and organizes those cells onto output links. Not shown are the physical line interfaces between the output link and the FSPP 16. The switch allocation table controls crossbar input to output mapping, connection bandwidth and the maximum delay through the switch fabric.

In order to traverse the switch, a cell 22 first enters the switch through an input port 24 and is buffered in a queue 26 of input buffers. The cell is then transmitted from the input buffers to a queue 28 of output buffers in an output port 30. From the output port 30, the cell is transmitted outside of the switch, for example, to another switch. To facilitate traversal of the switch, each input port 24 includes a TSPP 14, and each output port 30 includes an FSPP 16. The TSPPs and FSPPs each include cell buffer RAM 32 which is organized into respective queues 26, 28. All cells in a connection pass through a unique queue at each port, one at the TSPP and one at the FSPP, for the life of the connection. The queues thus preserve cell ordering. This strategy also allows quality of service ("QoS") guarantees on a per connection basis.

Request and feedback messages are transmitted between the TSPP and FSPP to implement flow control. Flow control prevents cell loss within the switch, and is performed after arbitration, but before transmission of the data cell. Flow control is implemented on a per connection basis.

Figure 2:
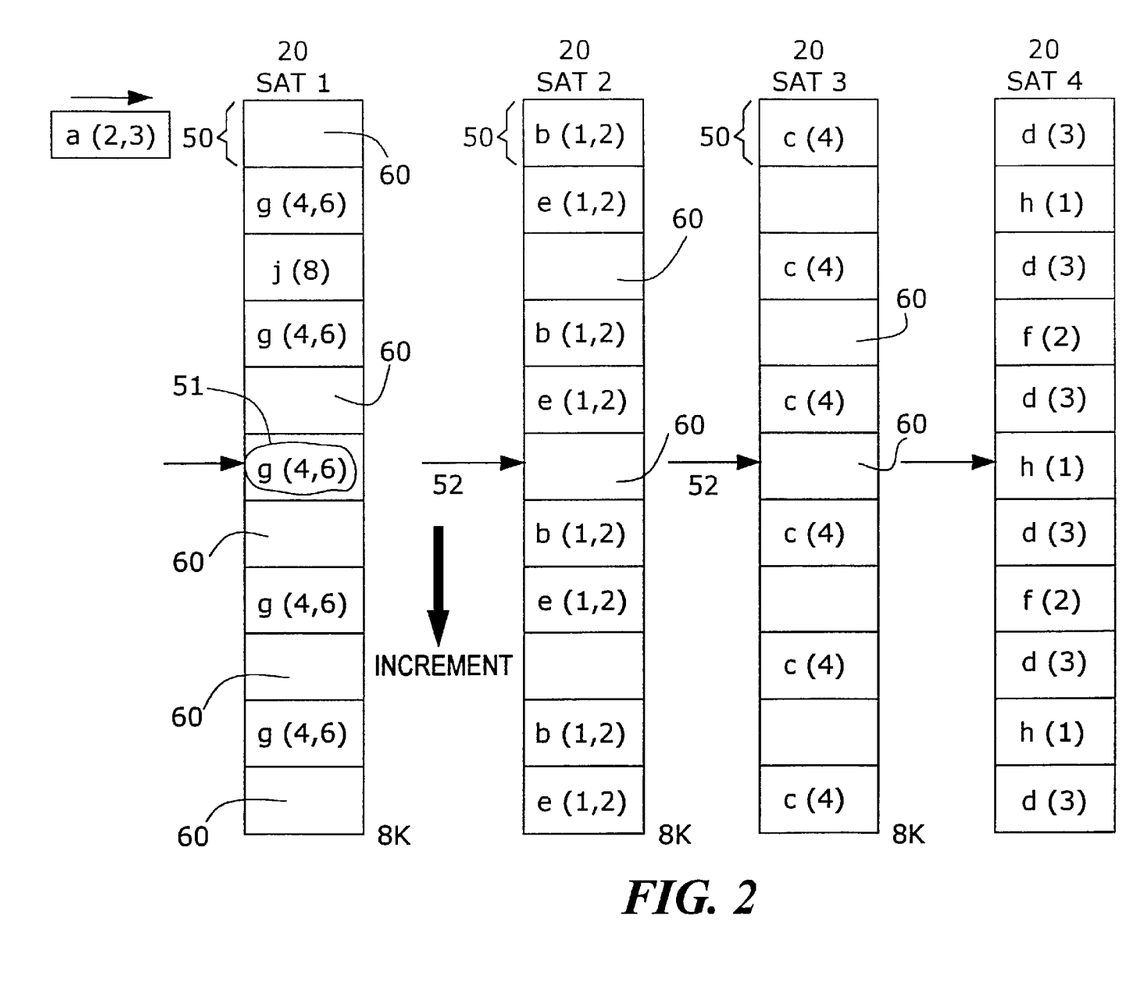
FIG. 2 is a block diagram which illustrates operation of the switch allocation tables of FIG. 1.

Referring now to FIGS. 1 & 2, each TSPP within the switch includes an SAT 20 which maps bandwidth allocation. The SAT is the basic mechanism behind cell scheduling. Each SAT 20 includes a plurality of sequentially ordered cell time slots 50 and a pointer 52 which is directed to one of the slots. All of the pointers in the switch are synchronized such that at any given point in time each of the pointers is directed to the same slot location in the respective SAT with which the pointer is associated, e.g., the first slot. In operation, the pointers are advanced in lock-step, each slot being active for 32 clock cycles at 50 MHz. When the pointer is directed toward a slot, the TSPP uses the corresponding entry 51 in the SAT to obtain a cell for launching into the switch fabric 10 and to begin flow control.

Each of the counters is incremented once for each cell time, and the pointer returns to the first slot after reaching the last slot. Hence, given an SAT depth of 8 k, which defines a frame, the pointers scan the SATs approximately every 6 msec, thereby providing a maximum delay for transmission opportunity of approximately 6 msec. The delay can be decreased by duplicating a given entry at a plurality of slots within the SAT. The maximum delay that an incoming cell will experience corresponds to the number of slots between the pointer and the slot containing the entry which specifies the destination of the cell. When multiple entries are made in order to decrease the maximum possible number of separating slots, the duplicate entries are therefore preferably spaced equidistantly within the SAT. Maximum delay for transmission opportunity therefore corresponds to the frequency and spacing of duplicate entries within the SAT.

The amount of bandwidth allocated to a particular connection corresponds to the frequency at which a given entry appears in the SAT. Each slot 50 provides 64 Kbps of bandwidth. Since the pointers cycle through the SATs at a constant rate, the total bandwidth allocated to a particular connection is equal to the product of 64 Kbps and the number of occurrences of that entry. For example, connection identifier "g (4,6)," which occurs in five slots, is allocated 320 Kbps of bandwidth.

Significantly, instantaneously unused bandwidth 60 will become available in the switch during operation. Such instantaneously unused bandwidth may occur because that bandwidth, i.e., that entry in the SAT, has not been allocated to any connection. Such bandwidth is referred to as "unallocated bandwidth." Unused bandwidth may also occur when the SAT entry is allocated to a connection, but the connection does not have a cell enqueued for transmission across the switch. Such bandwidth is referred to as "unused-allocated" bandwidth. Both types of unused bandwidth are collectively referred to as "dynamic" bandwidth, and some connections, such as connections assigned an Available Bit Rate ("ABR") QoS level utilize such dynamic bandwidth. The bandwidth arbiter operates to increase efficiency within the switch by granting dynamic bandwidth to such connections.

Figure 3:
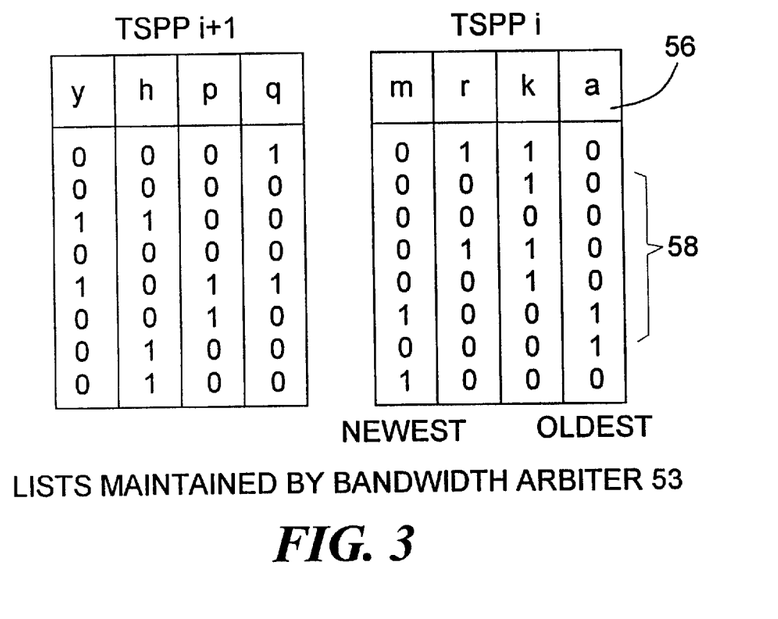
FIG. 3 is a block diagram which illustrates operation of the list maintained by the bandwidth arbiter.

Referring now to FIGS. 1–3, if a connection has no allocated bandwidth, or if the arriving cell rate is greater than the allocated rate as indicated by an input queue threshold, dynamic bandwidth may be employed. In either situation the point-to-multipoint transmission described in the SAT entry 51 is entered into a list 53 maintained by the bandwidth arbiter as a "request" in order that the point-to-multipoint transmission can be made at the next available opportunity.

The list 53 maintained by the bandwidth arbiter includes two fields for storing point-to-multipoint transmissions which utilize dynamic bandwidth. A connection identifier field 56 is employed to store the connection identifier, e.g., "a," and hence also indicates the port of origin. A bit vector field 58 is employed to indicate the designated output ports for transmission. The bit vector field is a bit mask which, in the case of an 8×8 switch, includes eight bits, each bit corresponding to a specific output port. Thus, for the exemplary SAT entry "a (2,3)" the list 53 contains "00000110" in the bit vector field (where the port identification numbers start from "1" rather than from "0"). The logic "1" values in the bit vector field indicate destination output ports "2" and "3," and the logic "0" values indicate non-destination output ports. The connections and bit vectors in the list 53 are entered sequentially in the order in which they are received.

To execute point-to-multipoint operation of cells described in the list maintained by the bandwidth arbiter the bandwidth arbiter tests for matches between the list and dynamic bandwidth. More particularly, the connection identifier 56 and bit vector 58 corresponding to "a (2,3)" is entered into the list 53 so that the cell will be transmitted when a dynamic bandwidth opportunity becomes available for simultaneous transmission to each output port designated by the request.

Referring now to FIGS. 1–4, to determine matches between the requests in the list maintained by the bandwidth arbiter and available bandwidth, the bandwidth arbiter first calculates an unassigned output port bit vector by ORing all allocated bit vectors from the SAT and toggling each resultant bit to provide a single unassigned output port bit vector. The unassigned output port bit vector is then matched against each request. For a particular input port the entered requests are tested in parallel for a match, and for simplification matching may be made against only the first four requests in the list. If all of the bits in a request match the unassigned bit vector, a match is made. When a match is made, the request is subtracted from the unassigned bit vector, and the result serves as the new unassigned bit vector which indicates remaining available output ports for matching against other input port request bit vectors in the list. After matching against each of the requests, the matched requests are transmitted and the transmitted requests are dequeued from the list.

Figure 4:
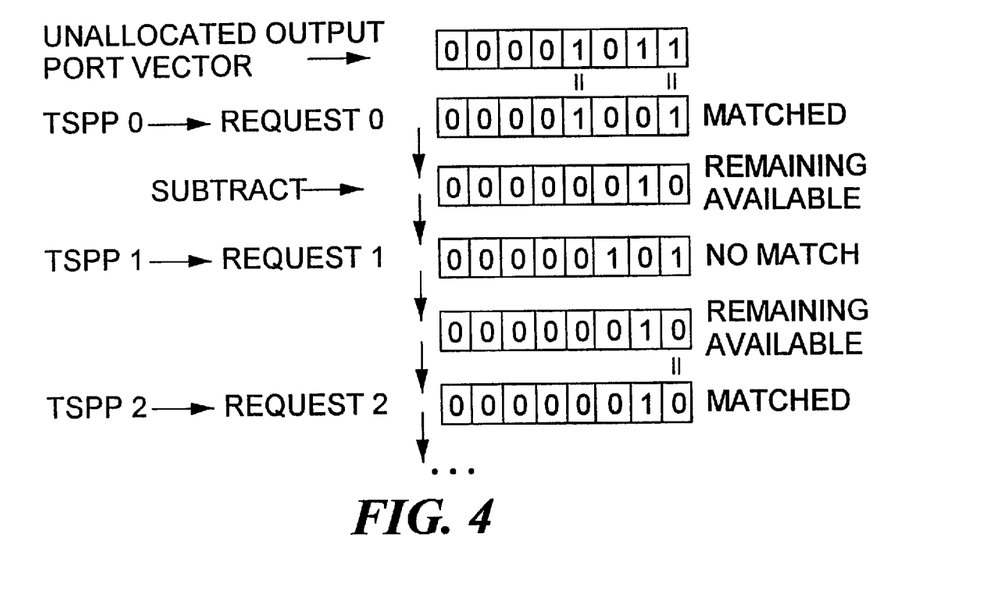
FIG. 4 is a flow diagram which illustrates matching between the request bit vectors and the unassigned output port bit vector.

A prioritization technique may be used in conjunction with the matching operation in the bandwidth arbiter in order to support switch traffic having different priority levels, such as QoS levels. To implement such prioritization each TSPP defines a priority level for each submitted request. Such priority levels could be HI and LO levels, or include greater than two levels. When prioritization is implemented the bandwidth arbiter attempts to match higher priority requests before attempting to match lower priority requests. Since the unassigned bit vector contains less unassigned bits as each subsequent match is made, the higher priority requests are then more likely to obtain a match and be transmitted than the lower priority requests. This higher likelihood for a match translates into a quicker response and greater bandwidth for such higher priority connections.

Figure 5:
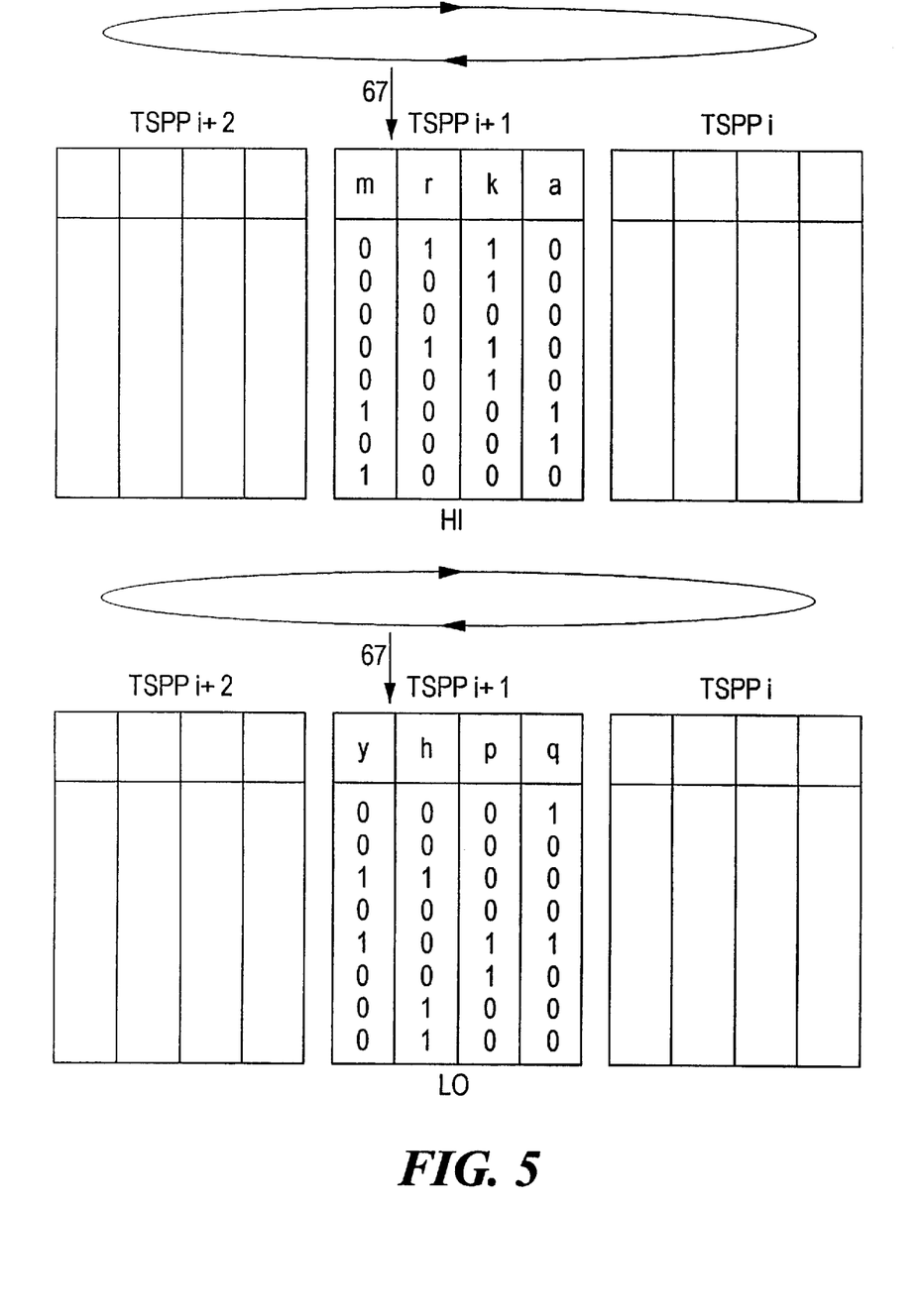
FIG. 5 is a block diagram which illustrates round-robin allocation of bandwidth to TSPP requests.

Referring now to FIG. 5, the bandwidth arbiter may grant bandwidth to requesting TSPPs by attempting to match available bandwidth on a round-robin basis. Matching is done in parallel, and granting is then attempted. A pointer 67 is employed to select a TSPP with which a grant opportunity is first attempted, e.g., TSPP i+1. After providing granting opportunities to TSPP i+1, granting opportunities are next provided to TSPP i+2, and so on ending with TSPP i such that granting opportunities are provided to each TSPP. If the first TSPP (here TSPP i+1) is able to transmit the cell in the oldest entry (here described by connection "a") then the pointer 67 begins with the next TSPP (here TSPP i+2) at the next cell time. However, if the first TSPP is not able to transmit the cell in the oldest entry then the pointer 67 begins with the same TSPP (here TSPP i+1) at the next cell time. When multiple matches are determined for a single TSPP the oldest match is selected for transmission. Thus, every point-to-multipoint connection is guaranteed to receive bandwidth.

When HI and LO prioritization is employed, separate HI and LO round-robin operations are executed to grant bandwidth. Each of the round-robin operations operates in the same fashion, but matching is not attempted on the LO priority requests until a match has been attempted with each of the HI priority requests. Hence, a separate round robin operation is executed for each priority level.

To further insure that there will be opportunities for point-to-multipoint connections to transmit, a portion of unassigned bandwidth, i.e., unallocated SAT entries, may be put aside for dedication to point-to-multipoint transmissions. This technique provides increased opportunity for point-to-multipoint connections which specify a greater number of output ports to be matched and transmitted, and prevents connections from becoming stuck or starved for bandwidth.

Figure 6:
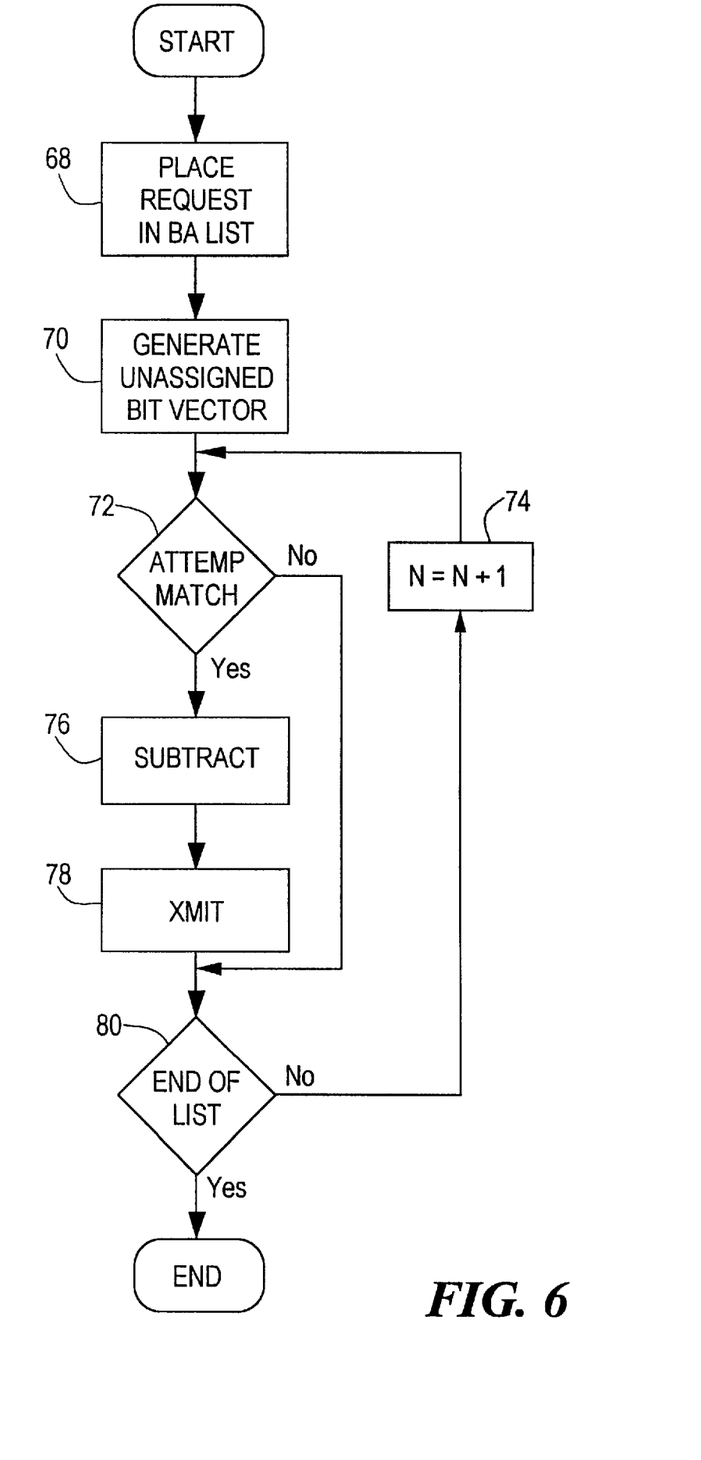
FIG. 6 is a flow diagram which illustrates a method of point-to-multipoint bandwidth arbitration.

FIG. 6 illustrates a method of point-to-multipoint arbitration. In a first step a bit vector representation of the SAT entry is entered 68 into the list as a connection identifier and output bit vector. In the next cell time, the allocated bit vectors are ORed and used to generate 70 the unassigned bit vector. An attempt is then made to match 72 the unassigned bit vector with request N in the list, where N is the oldest request in the list. If no match is made, N is incremented 74 and an attempt is made to match the unassigned bit vector with request N+1, i.e., the next oldest request in the list. If a match is made, the bit vector of the matched request is subtracted 76 from the unassigned bit vector to provide an updated unassigned bit vector. The cell corresponding to the matched request is then transmitted 78, and a determination 80 is made as to whether the end of the list maintained by the bandwidth arbiter has been reached. Flow ends if the end of the list has been reached, i.e., an attempt has been made to match the unassigned bit vector with each request in the list. If the end of the list has not been reached, N is incremented, and an attempt is made to match the next oldest request in the list with the unassigned bit vector.

Having described the preferred embodiments of the invention, it will now become apparent to one of skill in the art that other embodiments incorporating their concepts may be used. It is felt therefore that the invention should not be limited to disclosed embodiments, but rather should be limited only by the spirit and scope of the appended claims.

What is claimed is:

1. A network switch for facilitating transmission of a unit of data in a connection from an input port to a plurality of output ports, comprising:

a first map operative to store a representation of dynamic bandwidth that represents both unallocated bandwidth and unused-allocated bandwidth within the switch;

a second map operative to store a representation which identifies the output ports to which said unit of data is enqueued for transmission; and a matching operator which functions to match dynamic bandwidth to at least one representation of said unit of data enqueued for transmission by utilizing said first map and said second map, whereby said unit of data enqueued for transmission is transmitted to said plurality of output ports as matching dynamic bandwidth becomes available.

2. The network switch of claim 1 wherein said second map has a plurality of fields, including a first field operative to store a representation of the connection associated with said unit of data enqueued for transmission, including an identification of an input port of origin.

3. The network switch of claim 2 wherein said second map further includes a second field operative to store a representation which provides an identification of the output ports to which said unit of data enqueued for transmission is to be transmitted.

4. The network switch of claim 3 wherein said first map includes a table operative to store a bitmask which represents dynamic bandwidth within the switch, said table indexed by an index identifier.

5. The network switch of claim 1 wherein a plurality of units of data are enqueued and said matching operator functions to match dynamic bandwidth to a first occurring, matching unit of data of the plurality of units of data enqueued for transmission by sequentially providing opportunities to utilize such dynamic bandwidth starting from a first enqueued unit of data.

6. The network switch of claim 5 wherein said plurality of units of data are prioritized into at least two separate groups and said matching operator functions to match dynamic bandwidth to higher priority groups prior to matching dynamic bandwidth to lower priority groups.

7. The network switch of claim 4 wherein said matching operator generates an unassigned output port vector from said table, said unassigned output port vector being compared to said second field to match dynamic bandwidth with said enqueued unit of data.

8. The network switch of claim 7 wherein a plurality of units of data are enqueued and said second map includes a pointer for indicating the order in which enqueued units of data are provided with opportunities to transmit via dynamic bandwidth, said pointer being incremented to provide ordering of opportunities to transmit via dynamic bandwidth in a round-robin manner.

9. A method for point-to-multipoint transmission of a unit of data in a network switch comprising the steps of:

in a first storing step, storing a representation of said unit of data, including an identification of output ports designated for receipt of said unit of data, in a request list;

in a second storing step, storing a representation of dynamic bandwidth that represents both unallocated bandwidth and unused-allocated bandwidth in an allocation list;

comparing the request list to the allocation list to determine if a match therebetween exists; and transmitting said unit of data when a match is determined to exist.

10. The method of claim 9 wherein said first storing step includes the further step of storing a request map having a plurality of fields and including a connection field operative to store a representation of the connection associated with said unit of data enqueued for transmission, said representation including an identification of the port of origin of said unit of data.

11. The method of claim 10 wherein said first storing step includes the further step of storing a request bit vector representation having an identification of each output port to which said unit of data is to be transmitted.

12. The method of claim 11 wherein said second storing step includes the further step of storing a bitmask which represents dynamic bandwidth within the switch.

13. The method of claim 12 wherein said comparing step includes the further step of comparing the bitmask which represents dynamic bandwidth to the request bit vector.

14. The method of claim 13 wherein a plurality of bit request bit vectors are stored and said comparing step includes the further step of prioritizing the request bit vectors into at least two separate groups arranged from high priority to low priority, said comparing step being performed upon higher priority request bit vectors prior to said lower priority request bit vectors.

15. The method of claim 13 wherein the request bitmask field includes a pointer for indicating the order in which enqueued, matched units of data are first provided with opportunities to transmit via dynamic bandwidth, said comparing step including the further step of incrementing the pointer to provide ordering of transmission opportunities in a round-robin manner.

16. An asynchronous transfer mode ("ATM") switch for controlling a plurality of connections and transmitting an enqueued cell associated with one of said plurality of connections from a single input port to a plurality of designated output ports, comprising:

a first memory for temporarily storing said enqueued cell, a first portion of said first memory being reserved for use by at least one connection of the plurality of connections and a second portion of said first memory being shared by a portion of the plurality of connections;

a second memory containing an identification of unassigned output ports at specified time intervals at which dynamically available memory occurs in the reserved portion of memory and the shared portion of memory; and an arbiter circuit which controls allocation of the dynamically available memory to the plurality of connections, said arbiter circuit maintaining a record of the designated output ports and being operative to compare said identification of unassigned output ports to said record of designated output ports to identify a match therebetween, corresponding to a time at which said enqueued cell may be transmitted to a selected one of said plurality of designated output ports, said switch being operative to transmit said enqueued cell upon identification of said match.

17. The ATM switch of claim 16 wherein said record maintained by said arbiter circuit includes a connection identification field which provides an indication of the input port of origin associated with said enqueued cell.

18. The ATM switch of claim 17 wherein said record maintained by said arbiter circuit includes a bit vector field which provides an indication of output ports designated by the enqueued cell.

19. The ATM switch of claim 18 wherein said record maintained by said arbiter circuit includes a bit vector which provides an indication of input port of origin and designated output ports for said enqueued cell.

20. The ATM switch of claim 19 wherein a plurality of cells are enqueued, each having a bit vector associated therewith providing an indication of input port of origin and designated output ports, and said arbiter circuit performs a logical OR operation on said plurality of bit vectors to provide an unassigned output port bit vector indicative of dynamically available memory.

21. The ATM switch of claim 20 wherein each enqueued cell of the plurality of cells is transmitted only when each respective output port designated by such cell is matched to dynamically available memory.

22. The ATM switch of claim 21 wherein said bit vector field includes first and second sections, said first section being a high priority section and said second section being a low priority section, said arbiter circuit implementing prioritization by providing transmission opportunities to enqueued cells represented in said high priority section prior to providing transmission opportunities to enqueued cells represented in said low priority section.

23. The ATM switch of claim 22 wherein transmission opportunities are provided within said high priority section of said bit vector field in a round-robin manner.

24. The ATM switch of claim 23 wherein transmission opportunities are provided within said low priority section of said bit vector field in a round-robin manner.

25. The ATM switch of claim 24 wherein a portion of said second portion of said first memory is dedicated to point-to-multipoint transmission.

* * * * *